United States Patent
Min et al.

(10) Patent No.: US 12,492,938 B2
(45) Date of Patent: Dec. 9, 2025

(54) HYBRID REFLECTIVE MICROSCOPE OBJECTIVE

(71) Applicant: Thermo Electron Scientific Instruments LLC, Madison, WI (US)

(72) Inventors: Yan Min, Verona, WI (US); Francis J Deck, Madison, WI (US)

(73) Assignee: Thermo Electron Scientific Instruments LLC, Madison, WI (US)

( * ) Notice: Subject to any disclaimer, the term of this patent is extended or adjusted under 35 U.S.C. 154(b) by 502 days.

(21) Appl. No.: 18/053,018

(22) Filed: Nov. 7, 2022

(65) Prior Publication Data

US 2023/0168122 A1    Jun. 1, 2023

Related U.S. Application Data

(60) Provisional application No. 63/284,362, filed on Nov. 30, 2021.

(51) Int. Cl.
*G01J 3/02* (2006.01)
*G02B 21/04* (2006.01)

(52) U.S. Cl.
CPC ............ *G01J 3/0208* (2013.01); *G02B 21/04* (2013.01)

(58) Field of Classification Search
CPC ................................ G01J 3/0208; G02B 21/04
USPC ........................................................ 359/838
See application file for complete search history.

(56) References Cited

U.S. PATENT DOCUMENTS

| | | | | |
|---|---|---|---|---|
| 4,863,253 A | * | 9/1989 | Shafer .................... | G02B 21/04 359/861 |
| 5,291,339 A | | 3/1994 | Mochimaru et al. | |
| 5,347,364 A | * | 9/1994 | Kawasaki ............ | G01N 21/552 250/341.1 |
| 8,209,767 B1 | * | 6/2012 | Manassen ............ | G01B 11/026 850/3 |
| 2006/0138349 A1 | * | 6/2006 | Bleeker .................. | G03F 7/702 250/492.2 |
| 2008/0049304 A1 | * | 2/2008 | Deck ..................... | G01J 3/0208 359/350 |
| 2008/0144167 A1 | | 6/2008 | Meyers et al. | |
| 2014/0118819 A1 | * | 5/2014 | Sanson .................. | G02B 21/04 359/366 |

FOREIGN PATENT DOCUMENTS

WO         96/27784 A1    9/1996

OTHER PUBLICATIONS

Wang, et al., "Design method for an aspheric Schwarzschild objective with a low obscuration and an infinite conjugate distance", Optics Communications, vol. 460, 125055, 2020.
European Search Report issued in European Patent Application No. 22209053.2 dated Mar. 29, 2023.

* cited by examiner

*Primary Examiner* — Sharrief I Broome
(74) *Attorney, Agent, or Firm* — BakerHostetler

(57) ABSTRACT

Provided are systems and methods related to hybrid reflective microscope objectives and lens systems used in a spectroscopy system. The objective lens system includes a primary aspheric mirror having a first R-value; and a secondary aspheric mirror having a second R-value smaller than the first R-value, where in the objective lens system has a working distance of at least 20 mm and a numerical aperture of 0.29-0.65, and wherein surfaces of the primary and secondary aspheric mirrors have a non-zero sixth order aspheric parameter.

20 Claims, 8 Drawing Sheets

(6 of 8 Drawing Sheet(s) Filed in Color)

HYBRID REFLECTIVE MICROSCOPE OBJECTIVE

CROSS-REFERENCE TO RELATED APPLICATIONS

This application claims the benefit under 35 U.S.C. § 119(e) of U.S. provisional application no. U.S. 63/284,362, filed Nov. 30, 2021. The entire contents of the aforementioned application are incorporated by reference herein.

TECHNICAL FIELD

The present disclosure generally relates to microscope lens systems, and more particularly to reflective microscope objectives.

BACKGROUND

Infinity-corrected lens systems create an intermediate image from light beams from a sample using a bundle of parallel rays projected along an optical axis. Infinity-corrected objectives improved upon traditional fixed-tube objectives by eliminating the need for a pre-determined, specified tube length.

However, infinity-corrected objectives require longer focal lengths than traditional fixed-tube designs, and this can introduce magnifying power considerations and concerns for infinity-corrected objectives, since magnifying is inversely related to focal length. Moreover, greater focal lengths require larger working distances (i.e., the distance between a sample and a lens), which can be a limiting factor in practice. Accordingly, infinity-corrected objectives face challenges and potential restrictions with regard to magnifying power.

In addition, objective pupil diameters can be a limiting factor for infinity-corrected objectives. Pupil Diameter (D) is defined by 2 times the Numerical Aperture (NA) times the focal length (D=2NA*f). A greater tube length (i.e. greater focal length) requires a greater pupil diameter, and a smaller objective thread size (i.e. smaller pupil diameter) reduces numerical aperture. As such, it becomes challenging to balance these various optical characteristics to, for example, design an objective for various microscope systems and/or provide a desired magnification. Accordingly, improvements to existing lens systems and designs are needed to provide viable options for objectives for a variety of microscope systems and purposes.

SUMMARY

In one example, an objective lens system, comprises a primary aspheric mirror having a first R-value; and a secondary aspheric mirror having a second R-value smaller than the first R-value, an objective configured to receive light from a sample through a central aperture positioned at a working distance from the object where in the objective lens system has a working distance of at least 20 mm and a numerical aperture of 0.29-0.65, and wherein surfaces of the primary and secondary aspheric mirrors have a non-zero sixth order aspheric parameter.

In another example, a spectroscopy system, comprises at least a light source for generating a light; a first objective lens system for directing the light towards a sample, the sample positioned at a distance of at least 20 mm from the first objective lens system; and a detector for receiving light from the object. As such, the spectroscopy system may have an optimized spatial resolution of 1 µm or less and can acquire high quality image data.

BRIEF DESCRIPTION OF THE DRAWINGS

The file of this patent or application contains at least one drawing/photograph executed in color. Copies of this patent or patent application publication with color drawing(s)/photograph(s) will be provided by the Office upon request and payment of the necessary fee.

The summary, as well as the following detailed description, is further understood when read in conjunction with the appended drawings. For the purpose of illustrating the disclosed subject matter, there are shown in the drawings exemplary embodiments of the disclosed subject matter; however, the disclosed subject matter is not limited to the specific methods, compositions, and devices disclosed. In addition, the drawings are not necessarily drawn to scale. In the drawings.

DETAILED DESCRIPTION OF ILLUSTRATIVE EMBODIMENTS

Figure 1:
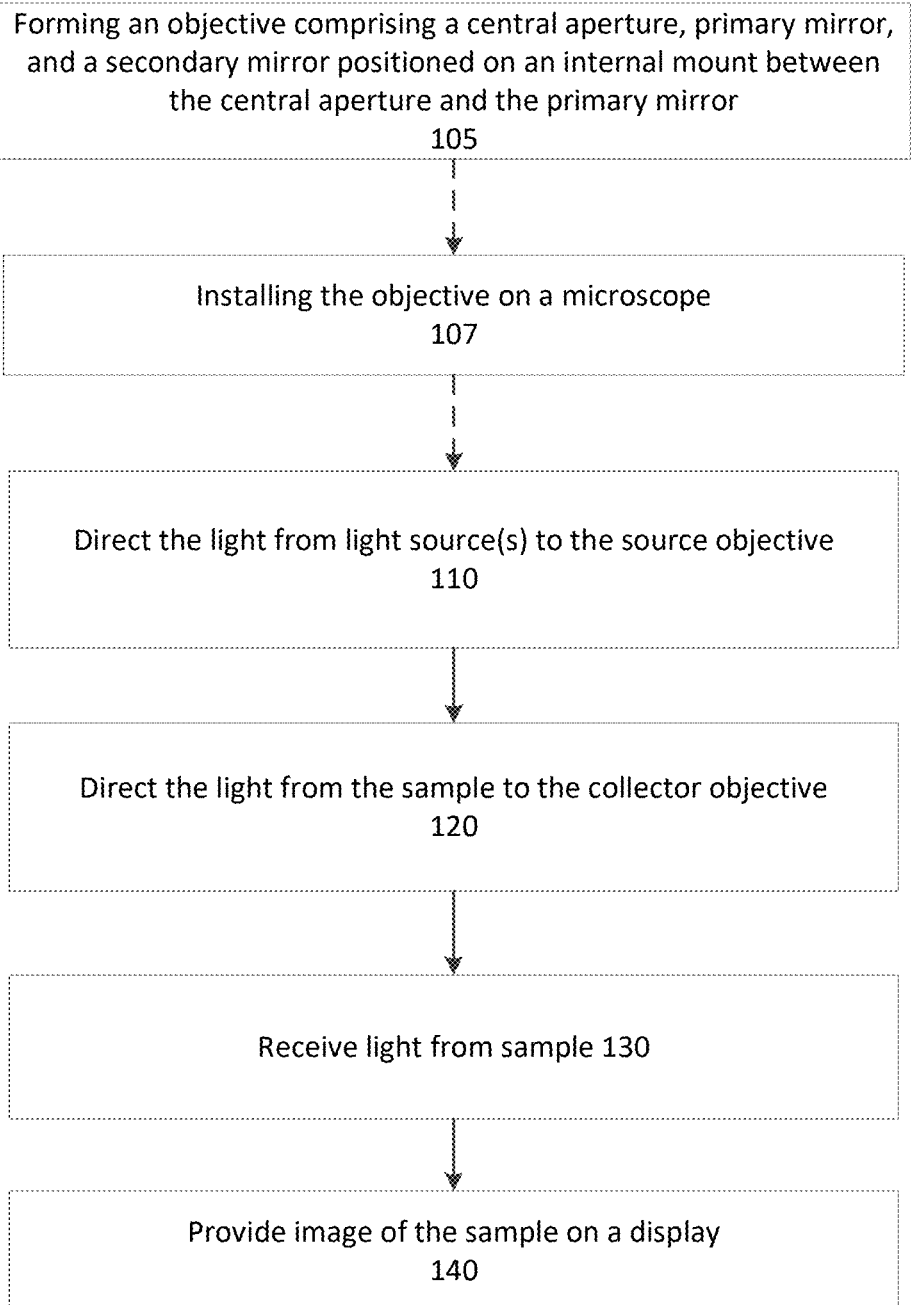
FIG. 1 illustrates an example flowchart in accordance with embodiments of the disclosed technology.

The present disclosure can be understood more readily by reference to the following detailed description taken in connection with the accompanying figures and examples, which form a part of this disclosure. It is to be understood that this disclosure is not limited to the specific devices, methods, applications, conditions or parameters described and/or shown herein, and that the terminology used herein is for the purpose of describing particular embodiments by way of example only and is not intended to be limiting of the claimed subject matter.

Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable. It is to be understood that the terminology used herein is for the purpose of describing particular aspects only and is not intended to be limiting.

It is to be appreciated that certain features of the disclosed subject matter which are, for clarity, described herein in the context of separate embodiments, can also be provided in combination in a single embodiment. Conversely, various features of the disclosed subject matter that are, for brevity, described in the context of a single embodiment, can also be provided separately or in any sub combination. Further, any reference to values stated in ranges includes each and every value within that range. Any documents cited herein are incorporated herein by reference in their entireties for any and all purposes.

Embodiments of the disclosed technology can provide an improved infinity-corrected reflective objective with a large numerical aperture and a large working distance at the same time. Despite the larger numerical aperture and working distance, embodiments can provide improved power and magnification, e.g., 15X or more, and can correct geometrical aberrations and improve image quality for both infrared and visual images in a spectroscopy system utilizing the objective.

Embodiments of the disclosed technology provide a hybrid Schwarzschild objective design that includes both primary and secondary mirrors with aspherical surfaces. For conventional Schwarzschild objective with spherical mirrors, the working distance is around 15 mm and the NA is around 0.5. Herein, by using aspherical mirrors as the primary and secondary mirror, the working distance of the objective lens system may be increased to be greater than 20 mm by adjusting the aspheric parameters of the curved surfaces, without sacrificing the NA of the objective lens system. The primary and secondary mirrors may both be even aspherical mirrors. The surfaces of the primary and secondary aspherical mirrors can be defined by a series of aspheric parameters. Applicants have found that surfaces with at least sixth order aspheric parameters provide the optimal results. For example, for objective with concentric even aspherical primary and secondary mirrors, surfaces with non-zero sixth order aspheric parameter can achieve a working distance greater than 20 mm and NA of 0.29-0.65 in the visible and infrared range (i.e. 400 nm-25 um wavelength range). In one example, the primary aspheric mirror has a second order aspheric parameter of 2e−5 to 3e−5 and a fourth order aspheric parameter of 2e−8 to 3e−8. In another example, the secondary aspheric mirror has a second order aspheric parameter of 9e−4 to 10e−4 and a fourth order aspheric parameter of 5e−6 to 6e−6. The first aspheric mirror and the second aspheric mirror are positioned at least 20 mm apart. In one example, the R-value of the primary mirror may be at least twice of the secondary mirror.

The objective may be used in a spectroscopy system, such as the spectroscopy system disclosed in U.S. patent U.S. Pat. No. 7,440,095B2 by Deck, which is incorporated by reference herein. The objective may be used in the spectroscopy system as the source objective and/or the collector objective. The objective may be positioned at the working distance from the sample held by the sample stage. As such, embodiments can provide greater numerical apertures and long working distance possibilities, while still providing more power for correcting geometrical aberrations and improving image quality for IR and Visual images (diffraction limited). Embodiments can further provide improved spatial resolution (e.g. less than 1 um) for the images and improve the Signal to Noise ratio for IR microscope performance. Embodiments can provide a spatial resolution of better than 1 um on visual without reducing numerical aperture, in IR and/or visual spectrums.

FIG. 1 illustrates a flowchart for operating a spectroscopy system including the lens systems discussed herein. Embodiments of the disclosed technology provide a hybrid objective, formed (at 105) by a primary mirror having a first radius of curvature (i.e., R-value) and a secondary mirror having a second R-value. An internal mount can hold and position the secondary mirror between a central aperture of the objective and the first mirror. At least one of the primary and secondary mirrors can be aspherical mirrors, such as an even aspherical mirror. The primary mirror can be positioned substantially parallel to objective and the secondary mirror. The primary aspheric mirror and secondary aspheric mirror can form a Schwarzschild structure.

In embodiments the first R-value is greater than the second R-value. In some embodiments, the first R-value is at least twice the second R-value. The first R-value can be at least, e.g., 40 mm, and in embodiments, between 40-43 mm. In other embodiments, the first R-value can be at least 41.00 mm, at least 41.65, at least 42.00 mm, at least 42.34 mm, and at least 43.00 mm. In embodiments the second R-value can be at least 14 mm. In some embodiments, the second R-value is about 14.11, 14.22, 14.33, 14.44, 14.55, 14.66, 14.77, 14.88, and 14.99 mm.

In various embodiments, the distance between the primary and secondary mirror is at least 20 mm. In some embodiments, the distance between the primary and secondary mirror is about 20 mm, 21 mm, 22 mm, 23 mm, 24 mm, 25 mm, 26 mm, 27 mm, 28 mm, 29 mm, or 30 mm.

The formed objective can optionally be installed on, and usable with, a microscope at 107, such as an infrared or visible spectroscopic microscope. The objective lens system may be either or both of the source objective for delivering the light towards the sample and the collector objective for collecting the light from the sample and directing the collected light to a detector. For example, as a collector objective, the objective lens system can receive light from a sample.

In one example, at 110, light emitted from the visible and/or IR source is directed towards the source objective. At 120, light transmitted through the sample enters the collector objective, and then received by a detector at 130. The source and/or collector objective may be positioned at the working distance from the sample. The working distance is at least 20 mm. In embodiments, the working distance be 20.1 mm, 20.2 mm 20.3 mm, 20.4 mm, 20.5 mm, 20.6 mm 20.7 mm, 20.8 mm, 20.9 mm, and greater.

At 140, image(s) of the sample is displayed. The display can comprise one or more of an analog or digital display, providing images via at least one of an eye piece, a computing device, and a screen, as discussed herein. The microscope can achieve aspatial resolution less than or equal to about 1 μm, 0.9 um, 0.8 um, and 0.7 um in the visible and IR wavelength range. Various embodiments can provide at least five-, ten-, or fifteen-times magnification of a sample.

Figure 2:
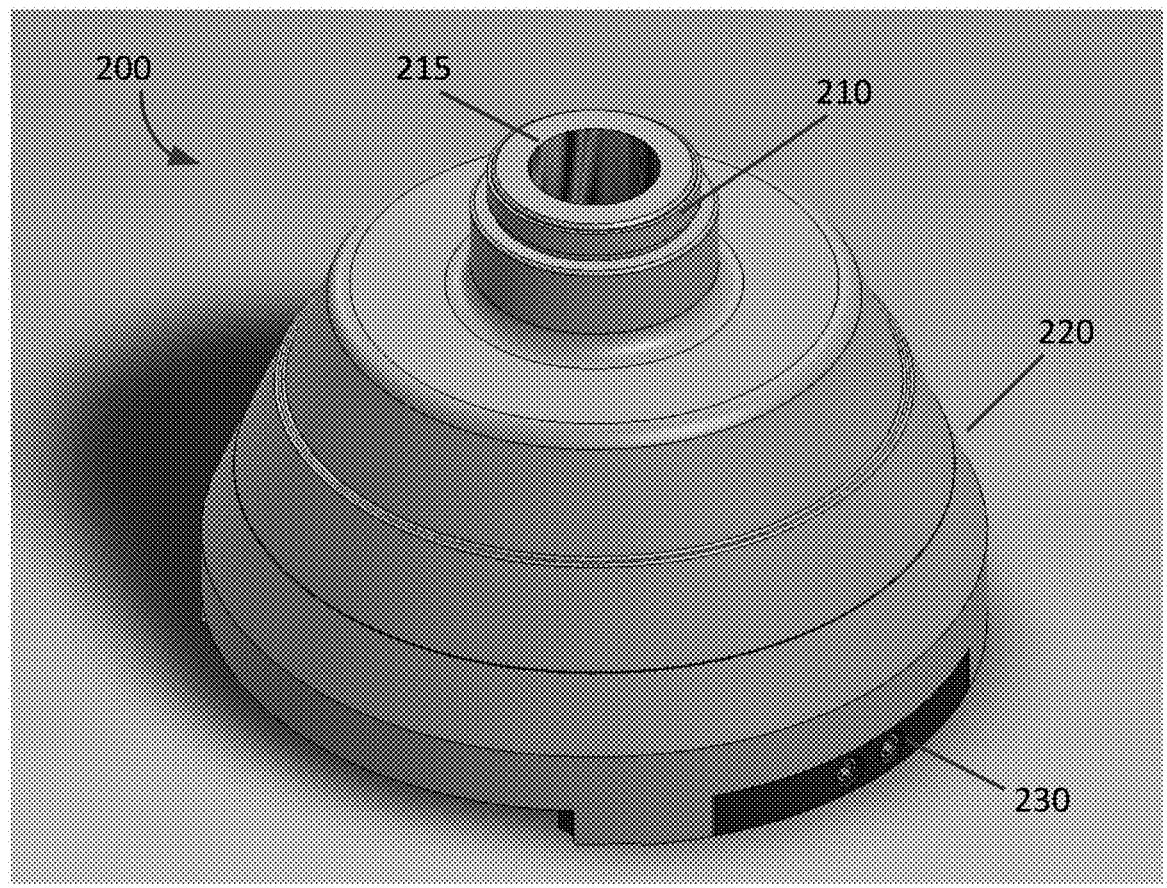
FIG. 2 illustrates a perspective view of an objective in accordance with embodiments of the disclosed technology.
Figure 3:
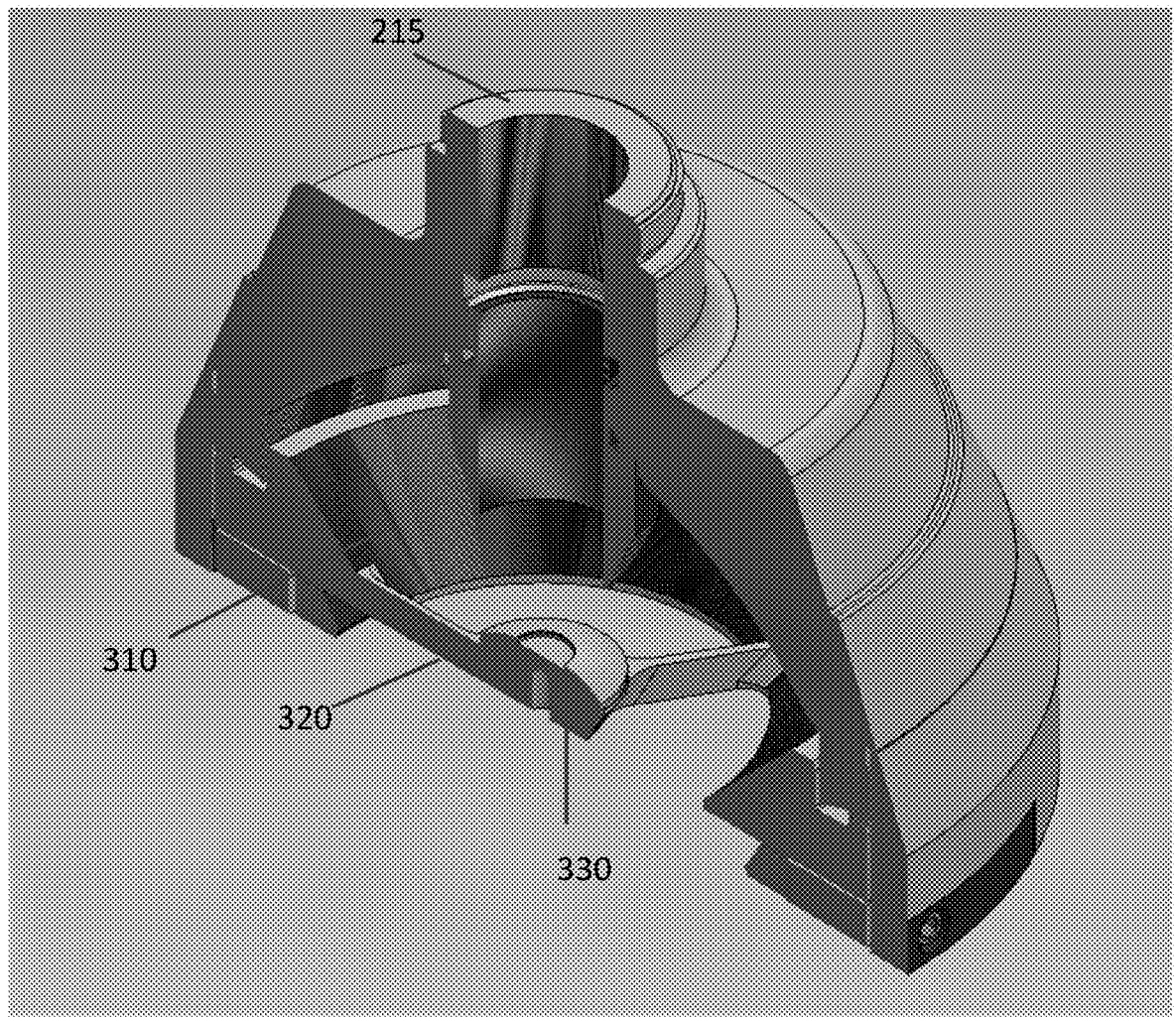
FIG. 3 illustrates a cross-sectional perspective view of an objective in accordance with embodiments of the disclosed technology.

FIGS. 2-3 illustrate an example objective in accordance with embodiments discussed herein. FIG. 2 illustrates a perspective view of an objective, and FIG. 3 illustrates a cross-sectional perspective view of the objective.

In FIG. 2, the objective 200 comprises a cylindrical section 210, a tapered section 220, and an optional external mount 230, which can assist with attaching the objective to a microscope or other lens system or apparatus. The objective serves to direct and focus light traveling through a central aperture 215 and two aspherical mirrors within the objective.

FIG. 3 illustrates a cross-sectional perspective view of the objective, along with the position of the primary mirror 310, an internal mount 320, and the secondary mirror 330 positioned on the internal mount 320.

Figure 4:
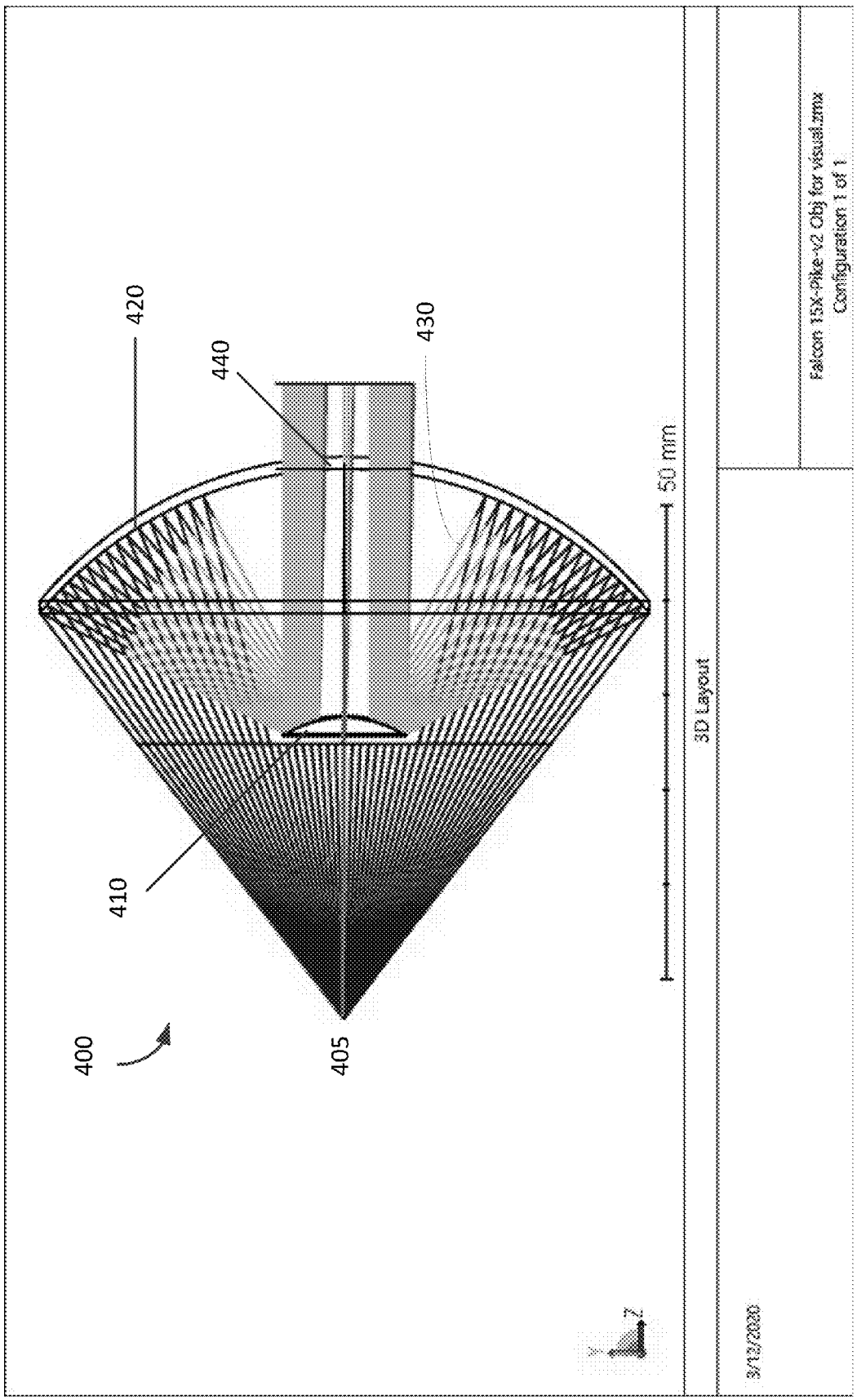
FIG. 4 illustrates a light path diagram in accordance with embodiments of the disclosed technology.

FIG. 4 illustrates a light path for the lens systems discussed herein, such as the objective 200. In one example, the light tracing begins at origin 405, which can be light reflecting from a sample of observation, traveling through a central aperture, e.g., central aperture 215. The secondary mirror 410 can be placed between the origin 405 and the primary mirror 420. As discussed herein, the primary mirror has a first R-value, which is greater than the second R-value of the secondary mirror 410. Each of the primary mirror and the secondary mirror can be aspherical.

Light passing through the central aperture reflects on the secondary mirror and/or reflects on the primary mirror's concave inner surface. Reflected light 430 passes to the convex surface of the secondary mirror 410, where it reflects and focuses through the central lens of the of primary mirror 440.

Figure 5:
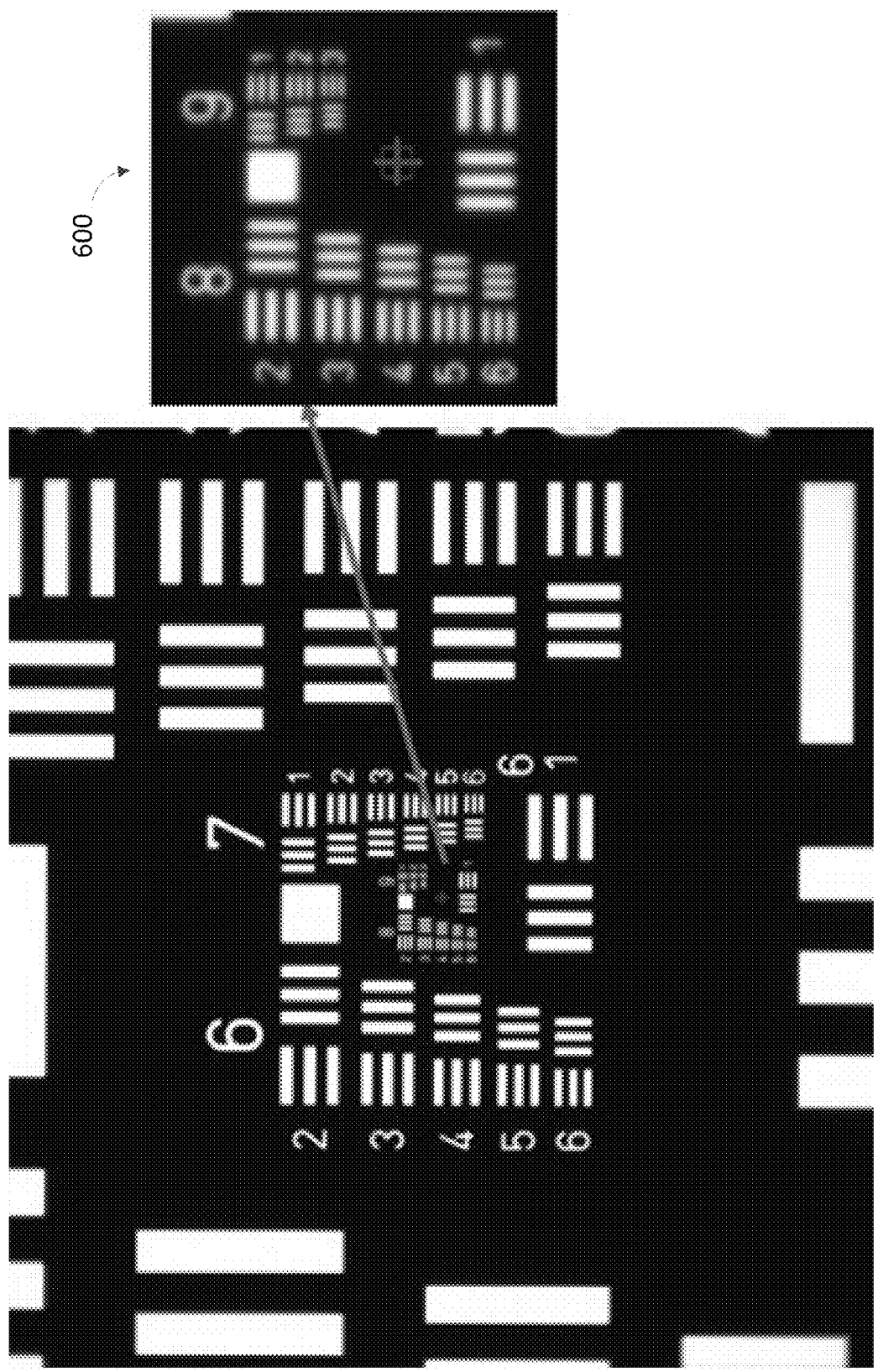
FIG. 5 illustrates a magnification output in accordance with embodiments of the disclosed technology.

FIG. 5 illustrates an example magnification and resolution resulting from the lens configuration discussed in FIG. 4 and various embodiments herein. FIG. 5 illustrates a magnification of a 1 micrometer by 1 micrometer area 600, and the improved spatial resolutions. The disclosed technology can provide a spectroscopy system with spatial resolutions of 1 µm or less in the infrared and visible wavelength range without reducing numerical aperture. In addition, both infrared and visual images can be provided at the diffraction limit without sacrificing numerical aperture and working distance. The primary and secondary mirrors utilize unique, even aspherical surface designs to provide a large numerical aperture and working distance, and improved spatial resolution of images. The configurations discussed herein also provide an improved signal-to-noise ratio for both visible and infrared performance.

In embodiments, an objective can utilize a hybrid Schwarzschild structure to provide results like that of FIG. 5, and characterized by the following: a primary, even aspheric mirror with a 42.01 R-value, a secondary even aspheric mirror with an R-value of 14.85 mm, a working distance of 25 mm, and a numerical aperture of 0.65.

Figure 6:
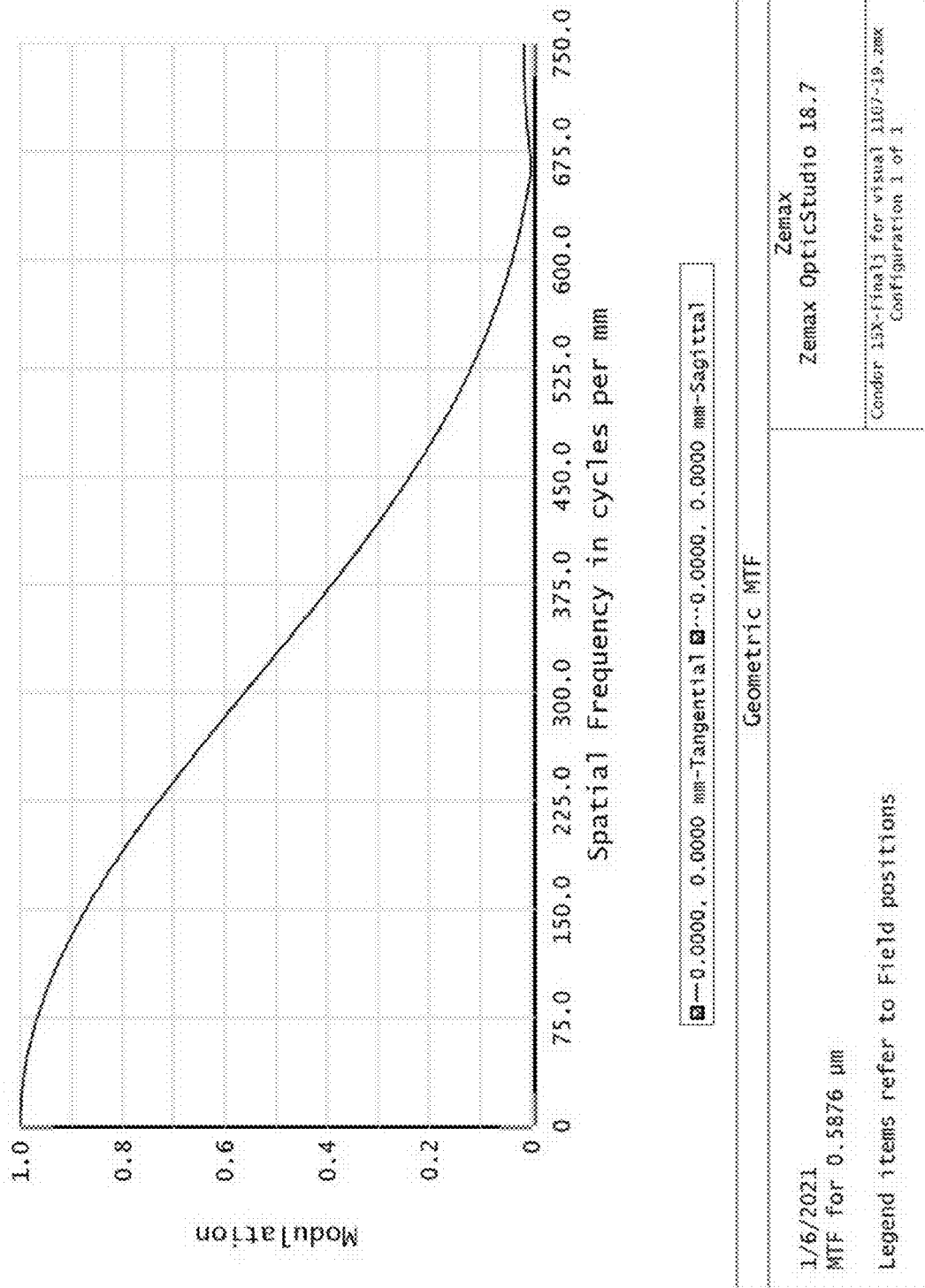
FIG. 6 illustrates modulation transfer function (MTF) curve in accordance with embodiments of the disclosed technology.

FIG. 6 graphically illustrates the modulation transfer function (MTF) of lens systems in accordance with embodiments. MTF directly measures the performance of the optics, the cutoff spatial frequency defines the limit of the spatial resolution the designed optics can reach. As shown in FIG. 6, the cutoff frequency is at about 650 line-pairs (lp)/mm, and demonstrates a spatial resolution limit of the design at 0.77 um.

Figure 7:
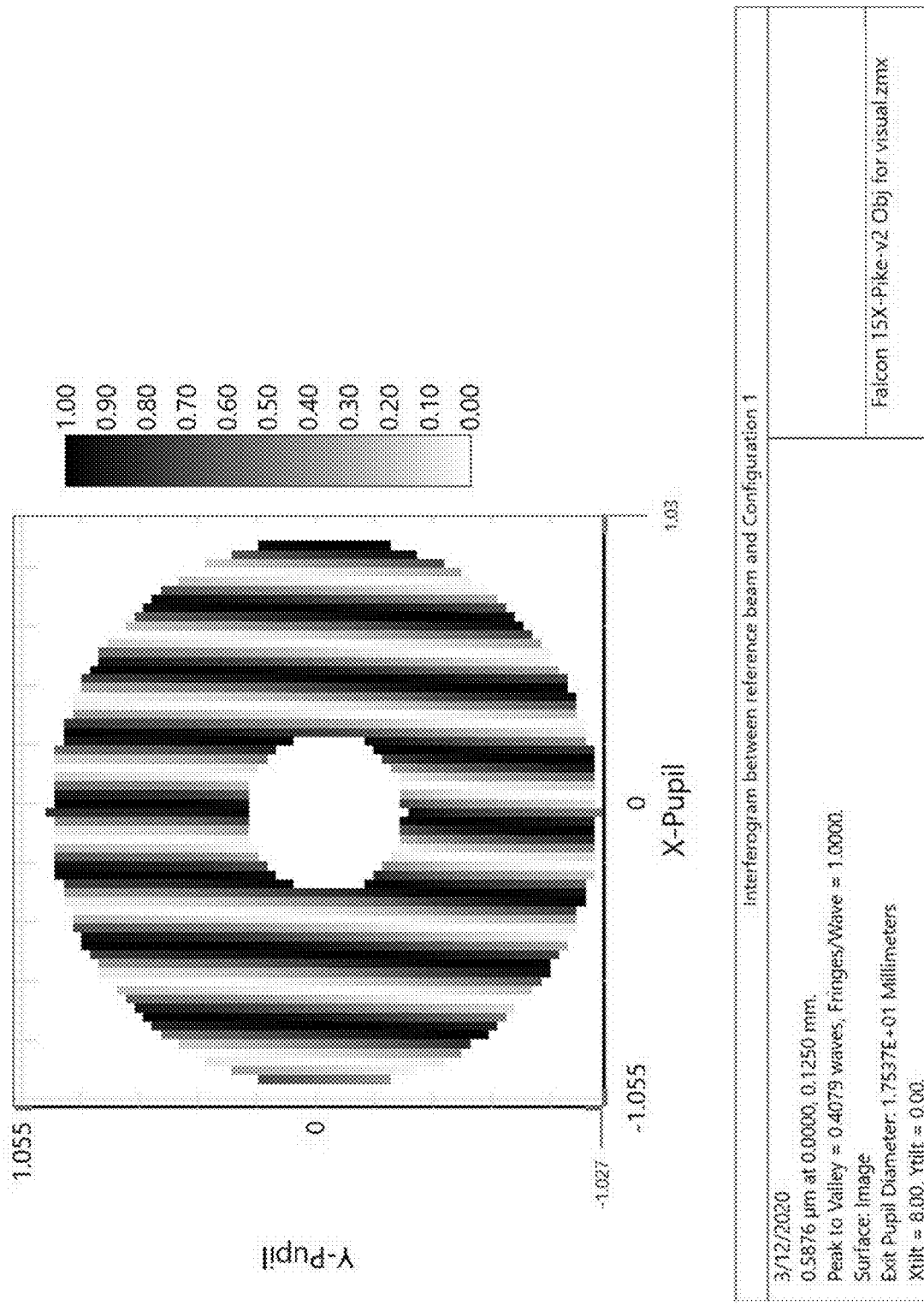
FIG. 7 illustrates an interferogram in accordance with embodiments of the disclosed technology.

FIG. 7 illustrates an interferogram, of the lens systems embodiments discussed herein. The interferogram fringes at the pupil represent the image quality and how well the aberrations been corrected. As such, any distortion of the fringes represents aberrations. The design here shows demonstrates that the distortion free interferogram demonstrates an improvement to the diffraction limit correction.

In particular, the interferogram of FIG. 7 demonstrates 0.5876 um at (0 mm, 0.1250 mm), a peak to valley value at 0.4079 waves, with Fringes/Waves being 1.0000, and an exit pupil diameter at 1.7535E01 mm.

Figure 8:
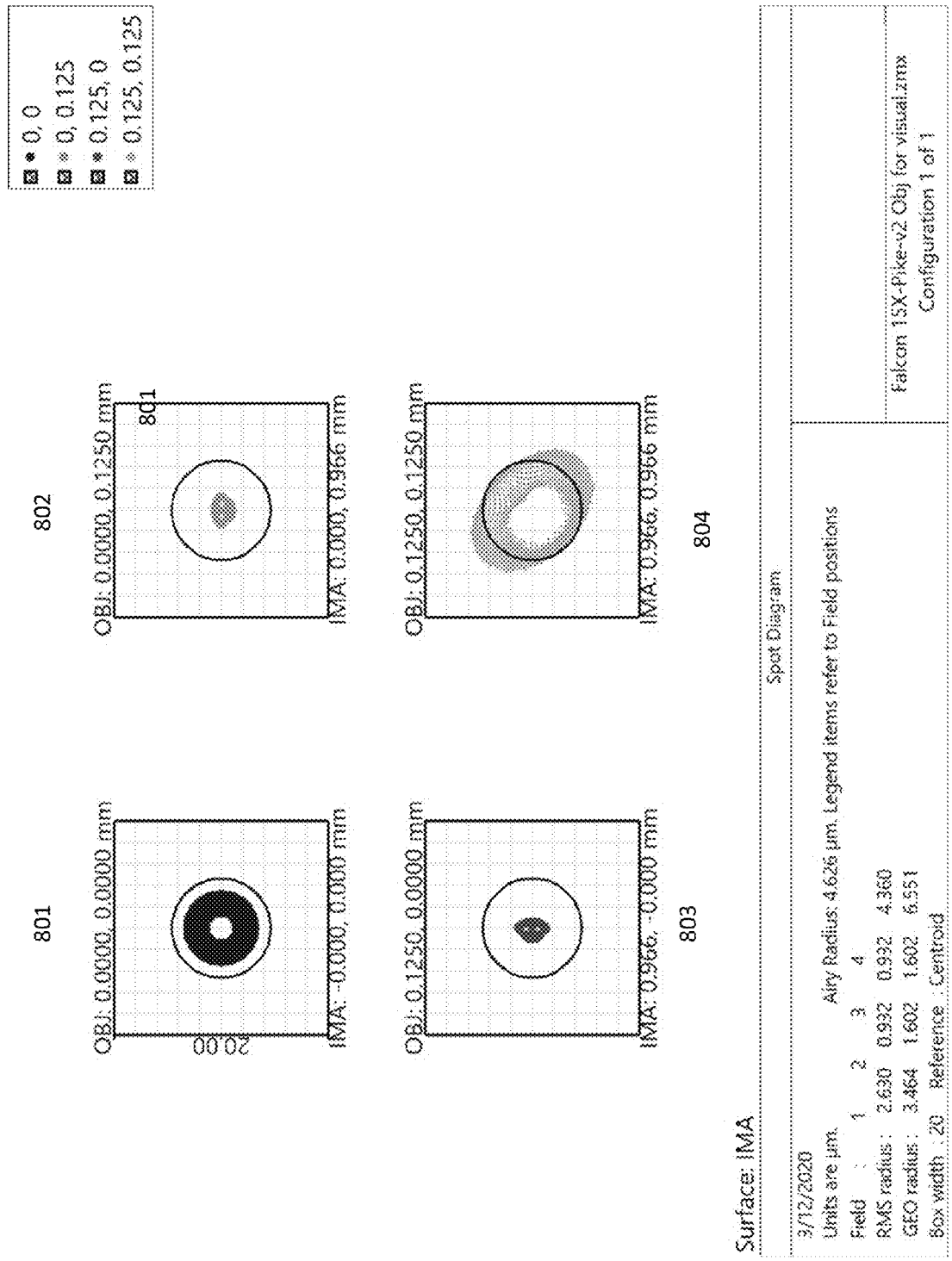
FIG. 8 illustrates spot diagrams in accordance with embodiments of the disclosed technology.

FIG. 8 illustrates a spot diagram of the lens system embodiments discussed herein. A spot diagram provides a measurement for imaging performance and provides an indication of how well an optical system can focus rays of light, ideally to a point. In each diagram 801-804, the circle demonstrates the Airy Radius of each field. The focus of each field 801-804, as represented by the spots within and around the circle, demonstrates a focus. FIG. 8 shows that the resolution of the spectroscopy system may be smaller than the Airy Radius. Therefore, the embodiments demonstrate a focus better than the diffraction limit, with the outer field showing at diffraction limit image quality.

The above-described aspects of the disclosure have been described with regard to certain examples and embodiments, which are intended to illustrate but not to limit the disclosure.

Aspects

The following Aspects are illustrative only and do not limit the scope of the present disclosure or the appended claims.

Aspect 1. A lens system, comprising: a primary aspheric mirror having a first R-value; a secondary aspheric mirror having a second R-value smaller than the first R-value; and an objective configured to receive light from a sample through a central aperture positioned at a working distance from the object; wherein the lens system directs the collimated light to the secondary aspheric mirror and the primary aspheric mirror, is characterized in providing a numerical aperture of about 0.29-0.65, and focuses the collimated light, through the primary aspheric mirror and secondary aspheric mirror to a spatial resolution of 1 micrometer or less at working distances of at least 20 mm, and wherein the primary aspheric mirror is positioned at a distance from the secondary aspheric mirror and is substantially parallel to the objective and secondary aspheric mirror.

Aspect 2. The lens system of Aspect 1, wherein the primary aspheric mirror and the secondary mirror are even aspherical mirrors, and wherein surfaces of the primary and secondary aspheric mirrors have a non-zero sixth order aspheric parameter. The primary aspheric mirror and the secondary aspheric mirror are even aspherical mirrors. The second order aspheric parameter of the surface of the primary mirror is between 2e−5 and 3e−5. The fourth order aspheric parameter of the surface of the primary mirror is between 2e−8 and 3e−8. The second order aspheric parameter of the surface of the secondary mirror is between 9e−4 and 10e−4. The fourth order aspheric parameter of the surface of the secondary mirror is between 5e−6 and 6e−6.

Aspect 3. The lens system of Aspect 2, where in the primary aspheric mirror and secondary aspheric mirror form a Schwarzchild structure.

Aspect 4. The lens system of any one of Aspects 1-3, wherein the first R-value is at least twice the second R-value.

Aspect 5. The lens system of Aspect 4, wherein the first R-value is at least 42 mm, and in embodiments can be, e.g., 42.01 mm or 42.34 mm, or even from 41.80 to 43.50 mm.

Aspect 6. The lens system of Aspect 5, wherein the first R-value is about 42.34 mm.

Aspect 7. The lens system of Aspect 4, wherein the second R-value is at least 14, e.g., 14.85 or even 14.6568 mm. The second R-value can be, e.g., from 14.20 to 14.90 mm.

Aspect 8. The lens system of Aspect 7, wherein the second R-value is about 14.66 mm.

Aspect 9. The lens system of any one of Aspects 1-8, wherein the working distance is about 20.8 mm, e.g., from 20.1 mm to 21.5 mm.

Aspect 10. The lens system of any one of Aspects 1-9, wherein the distance between the primary aspheric mirror and secondary aspheric mirror is greater than about 20 mm, e.g., from 26.4 mm to 27.8 mm.

Aspect 11. The lens system of Aspect 10, wherein the distance is between the primary aspheric mirror and secondary aspheric mirror is about 27 mm.

Aspect 12. The lens system of any one of Aspects 1-11, wherein the collimated light comprises wavelengths within the infrared and visible spectrums.

Aspect 13. The lens system of any one of Aspects 1-12, wherein the objective comprises a cylindrical upper section, an internal mount for positioning the secondary mirror, and a tapered lower section for directing the collimated light.

Aspect 14. The lens system of any one of Aspects 1-13, wherein the spatial resolution is 0.7 μm. As described elsewhere herein, the spatial resolution can be 1 μm or even better, e.g., 0.9 μm, 0.8 μm, or even 0.7 μm.

Aspect 15. A system, the system comprising a lens system according to any one of Aspects 1-14 and further comprising a source of illumination.

Aspect 16. The lens system of Aspect 15, wherein the source of illumination comprises a source of infrared illumination or a source of visible light.

Aspect 17. The lens system of any one of Aspects 1-16, further comprising a sample stage configured to maintain a sample in position for observation by the lens system.

Aspect 18. A method, comprising: receiving, at an objective, collimated light from a sample, wherein the objective comprises a central aperture, and provides a numerical aperture of about 0.29-0.65; directing the collimated light from the sample through the central aperture, positioned a working distance above the object, wherein the working distance is at least 20 mm; focusing the light from the central aperture via a primary aspheric mirror having a first R-value and a secondary aspheric mirror having a second R-value, to a spatial resolution of 1 micrometer or less, wherein the second R-value is smaller than the first R-value, the primary aspheric mirror receives light directed by the secondary aspheric mirror, and the primary aspheric mirror and the secondary aspheric mirror are optionally arranged in a Schwarzchild structure.

Aspect 19. The method of Aspect 18, wherein the objective is a reflective infrared objective providing at least fifteen times magnification of the object.

Aspect 20. The method of Aspect 18, wherein the primary aspheric mirror and the secondary aspheric mirror are even/concentric aspherical mirrors.

Aspect 21. The method of Aspect 20, wherein the first R-value is at least twice the second R-value.

Aspect 22. The method of Aspect 21, wherein the first R-value is at least 42 mm.

Aspect 23. The method of Aspect 21, wherein the second R-value is at least 14 mm.

Aspect 24. The method of any one of Aspects 18-23, wherein the distance is between the primary aspheric mirror and secondary aspheric mirror is greater than 20 mm.

Aspect 25. The method of Aspect 24, wherein the distance is between the primary aspheric mirror and secondary aspheric mirror is about 27 mm.

Aspect 26. The method of any one of Aspects 18-25, wherein the collimated light comprises wavelengths within the infrared and visible spectrums.

Aspect 27. The method of any one of Aspects 18-26, further comprising installing the objective on an infrared or visible spectrum microscope.

Aspect 28. The method of any one of Aspects 18-27, further comprising: mounting the secondary aspheric mirror an internal mount within the objective, the secondary aspheric mirror positioned above the central aperture, and below the primary aspheric mirror.

Aspect 29. The method of any one of Aspects 18-28, wherein the spatial resolution is 0.7 um.

Aspect 30. The method of any one of Aspects 18-28, wherein the working distance is about 20.8 mm.

What is claimed:

1. An objective lens system, comprising:
    a primary aspheric mirror having a first R-value; and
    a secondary aspheric mirror having a second R-value smaller than the first R-value, wherein the primary and secondary aspheric mirrors form a Schwarzchild structure having a working distance of at least 20 mm and a numerical aperture of 0.29-0.65, and wherein surfaces of the primary and secondary aspheric mirrors are defined by a series of aspheric parameters including a non-zero sixth order aspheric parameter.

2. The objective lens system of claim 1, wherein the primary aspheric mirror and the secondary aspheric mirror are even aspherical mirrors.

3. The objective lens system of claim 2, wherein the second order aspheric parameter of the surface of the primary mirror is between 2e-5 and 3e-5.

4. The objective lens system of claim 3, wherein the fourth order aspheric parameter of the surface of the primary mirror is between 2e-8 and 3e-8.

5. The objective lens system of claim 2, wherein second order aspheric parameter of the surface of the secondary mirror is between 9e-4 and 10e-4.

6. The objective lens system of claim 5, wherein fourth order aspheric parameter of the surface of the secondary mirror is between 5e-6 and 6e-6.

7. The objective lens system of claim 1, wherein the primary aspheric mirror and the secondary aspheric mirror are concentric aspherical mirrors.

8. The objective lens system of claim 1, wherein the first R-value is at least twice of the second R-value.

9. The objective lens system of claim 8, wherein the first R-value is at least 42 mm, optionally from 41.8 to 43.5 mm.

10. The objective lens system of claim 8, wherein the second R-value is at least 14 mm, optionally from 14.20 mm to 14.90 mm.

11. The objective lens system of claim 1, wherein the working distance is from 20.1 to 21.5 mm.

12. The objective lens system of claim 1, wherein a distance between the primary aspheric mirror and secondary aspheric mirror is greater than 20 mm.

13. The objective lens system of claim 12, wherein the distance between the primary aspheric mirror and secondary aspheric mirror is from 26.4 to 27.8 mm.

14. The objective lens system of claim 1, further comprising a cylindrical section forming a central aperture, an internal mount for positioning the secondary aspheric mirror, and a tapered section for housing the primary mirror.

15. The objective lens system of claim 1, wherein the objective lens system has the working distance of at least 20 mm and the numerical aperture of 0.29-0.65 at a wavelength range of 400 nm to 25 um.

16. The objective lens system of claim 1, wherein the first aspheric mirror and the second aspheric mirror are arranged in a Schwarzchild structure.

17. A spectroscopy system, comprising:
    at least a light source for generating a light;
    a first objective lens system according to claim 1 for directing the light towards a sample, the sample positioned at a distance of at least 20 mm from the first objective lens system; and
    a detector for receiving light from the object.

18. The spectroscopy system of claim 17, wherein the spectroscopy system has a spatial resolution of 1 micrometer or less for infrared and visible light.

19. The spectroscopy system of claim 17, further comprising a second objective lens system according to claim 1 for collecting the light from the sample and directing the collected light to the detector.

20. The spectroscopy system of claim 17, wherein the light generated by the light source is in the infrared spectrum, and the spectroscopy system further includes a second light source for generating a light in the visible spectrum, and the first objective lens further directing the light generated by the second light source towards the object.

* * * * *